United States Patent [19]
Wu

[11] Patent Number: 5,730,374
[45] Date of Patent: Mar. 24, 1998

[54] PEPPER GRINDING TOOL

[75] Inventor: Hua-Te Wu, Tainan, Taiwan

[73] Assignee: Yienn Lih Enterprise Co., Ltd., Tainan, Taiwan

[21] Appl. No.: 755,372

[22] Filed: Nov. 25, 1996

[51] Int. Cl.$^6$ .................................................. A47J 42/34
[52] U.S. Cl. ................................................................ 241/169
[58] Field of Search ............................. 222/142.1–142.7; 241/169, 262, 270, 168

[56] References Cited

U.S. PATENT DOCUMENTS

| | | | |
|---|---|---|---|
| 4,697,749 | 10/1987 | Holcomb et al. | 241/169 |
| 5,199,655 | 4/1993 | Yang | 241/169 |

*Primary Examiner*—Mark Rosenbaum
*Attorney, Agent, or Firm*—Morton J. Rosenberg; David I. Klein; Jun Y. Lee

[57] ABSTRACT

A condiment grinding tool is provided. The condiment grinding tool includes a head member having a lower end portion; a grinding support assembly coupled to the lower end portion of the head member; a grinding assembly coupled to the grinding support assembly; a handled member displaceably coupled to the head member; and a displaceable depressed block coupled to the grinding assembly. The grinding support assembly includes an adjustably positioned grinder part having a toothed portion formed thereon. The grinding assembly includes a toothed plate which is positioned in opposition to the grinder part toothed portion. When a user actuates the handled member by imparting upon it a displacement, the displacement is transferred by the depressed block to force the linear displacement of the toothed plate relative to the toothed portion of the grinder part. The condiment is ground therebetween into particulate form for dispensing. The grinding assembly includes a mechanism for resiliently biasing the displacement of its parts for this grinding operation.

6 Claims, 5 Drawing Sheets

PEPPER GRINDING TOOL

FIELD OF THE INVENTION

The present invention relates to a pepper grinding tool, which is used for grinding pepper, a common seasoning, into finer one to meet the dining need.

SUMMARY OF THE INVENTION

This invention relates to a pepper grinding tool which comprises head member, a bottom socket, a restraining plate, a guide member, an adjustable grinder part, a movable member, a depressed block, a handled member, and an adjustment block as the main parts.

The head member is combined with the bottom socket and includes a hollow portion, which is a hollow on a mediate portion thereof.

The bottom socket has a condiment exit on a bottom thereof, and houses the adjustable grinder part, the guide member, and the restraining plate therein; the grinder part has a sloped toothed portion movable through a channeled guide of the guide member. The restraining plate is positioned over the guide member.

The movable member is disposed within the bottom socket, passed through a hole on the restaining plate and communicating with the exit of the bottom socket, and operationally associated with a spring.

A toothed plate is anchored onto the movable member and opposes the sloped toothed portion.

The depressed block is arranged in the hollow portion and connected to the movable member on a bottom portion.

The handle member is pivoted onto the head member and is movably housed inside the hollow portion. The handled member further has a pushing block which is shaped curve and arranged over a slope on an uppermost part of the depressed block such that the handled member can depress the depressed block downward upon downward pivotal movement inwardly of the hollow portion.

There is provided an opening on the bottom socket and an adjustment block is movably is fitted onto the opening. The block further has a pushing portion passed through the opening and fitted into a channel formed under the adjustable grinder part so that the pushing portion can force the grinder part to slide as long as the adjustment block is moved along the opening.

In operation, the toothed plate is slid up and down reciprocatingly by the operator pressing the handled member and by means of the spring; thus, the toothed plate and the toothed portion of the grinder part can grind the pepper therebetween into finer one. The ground pepper is then dropped out of the bottom socket through the condiment exit.

In adjusting the adjustable grinder part, the adjustment block is pushed leftward or rightward so that the pushing portion within the channel can force the grinder part to move forward or backward to adjust the distance between the toothed plate and the toothed portion.

BRIEF DESCRIPTION OF DRAWINGS

The invention will be better understood by reference to the accompanying drawings, wherein.

DESCRIPTION OF THE PREFERRED EMBODIMENTS

Figure 1:
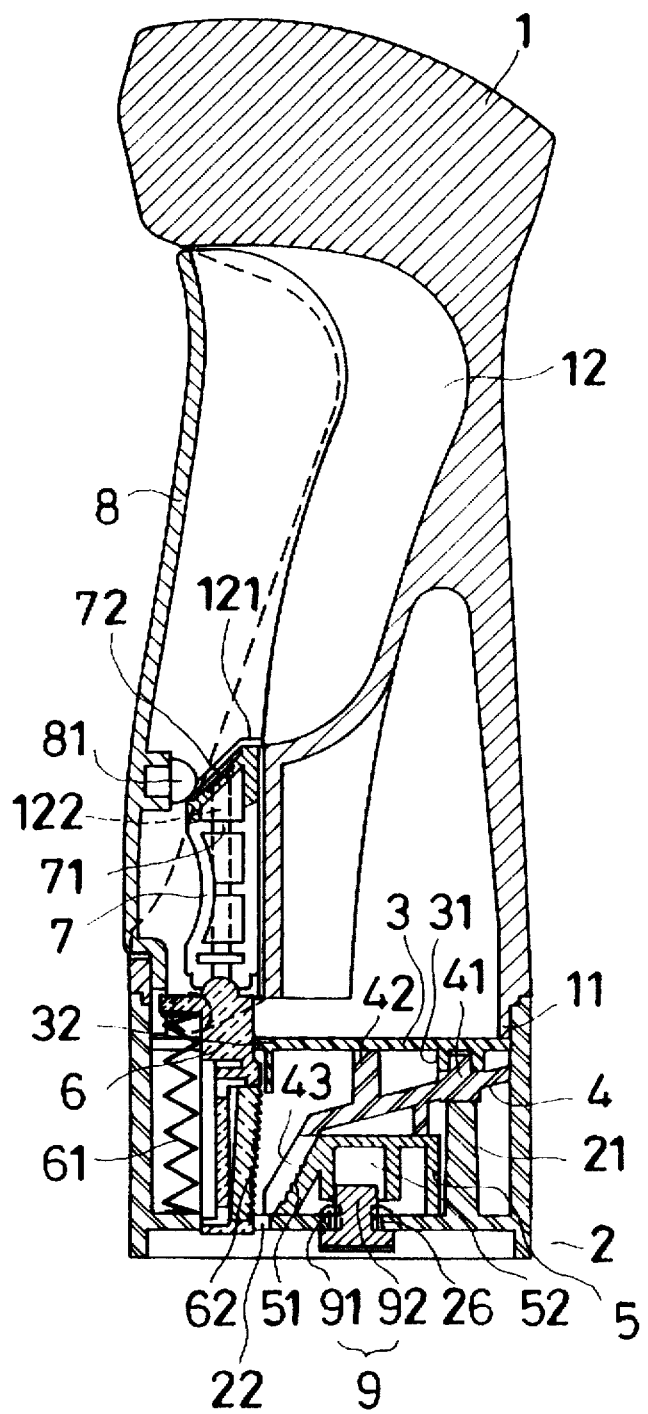
FIG. 1 is a sectional view of profile of a pepper grinder with an improved fixing element according to the present invention.

The pepper grinding tool of the present invention comprises a head member 1, a bottom socket 2, a restraining plate 3, a guide member 4, an adjustable grinder part 5, a movable member 6, a depressed block 7, a handled member 8, and an adjustment block 9 as the main parts.

The head member 1 includes a flange 11 on a bottom thereof, and a hollow portion 12, which is a hollow on a mediate portion thereof.

The bottom socket 2 has a plurality of erecting poles 21 therein, and a condiment exit 22 on a bottom thereof, and houses the adjustable grinder part 5, the guide member 4, and the restraining plate 3 therein; the adjustable grinder part 5 is positioned under the guide member 4 and has a sloped toothed portion 51 communicating with, and movable through, a channeled guide 43 of the guide member 4; the guide member 4 is further supported by the erecting poles 21 and has a plurality of projections 41 retained inside, and affixed by, a same number of complementary sockets 31 of the restraining plate 3. The plate 3 is further supported by a projection 42 of the guide member 4 to sustain a still firmer position. The movable member 6 is disposed within the bottom socket 2, passed through a hole 32 on a front part of the restaining plate 3 and communicating with the exit 22 of the bottom socket 2, and operationally associated with a spring 61 connected to the bottom socket 2.

Figure 4:
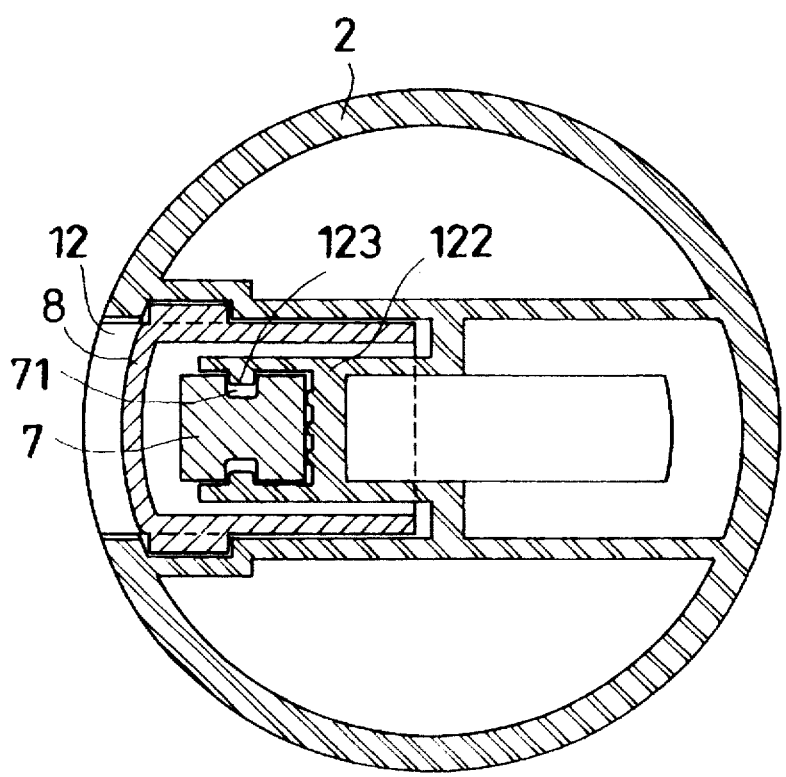
FIG. 4 is a buttom view showing a head member, a depressed block and a handled member of an improved fixing element according to the present invention.
Figure 5:
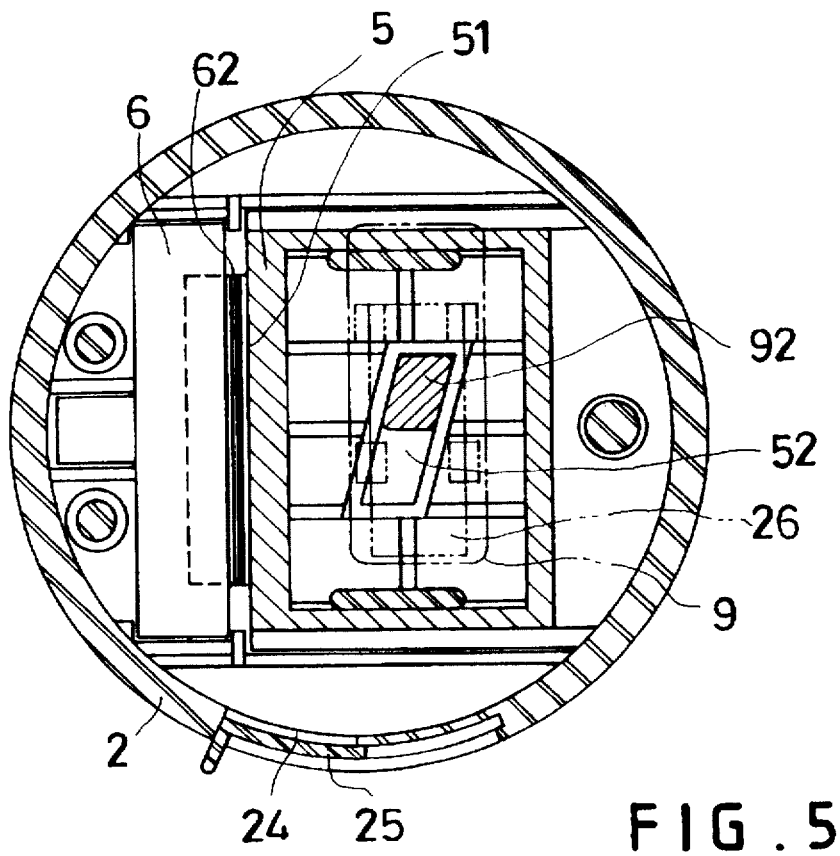
FIG. 5 is a view showing the toothed portion and the toothed plate which can be adjusted its position.
Figure 3:
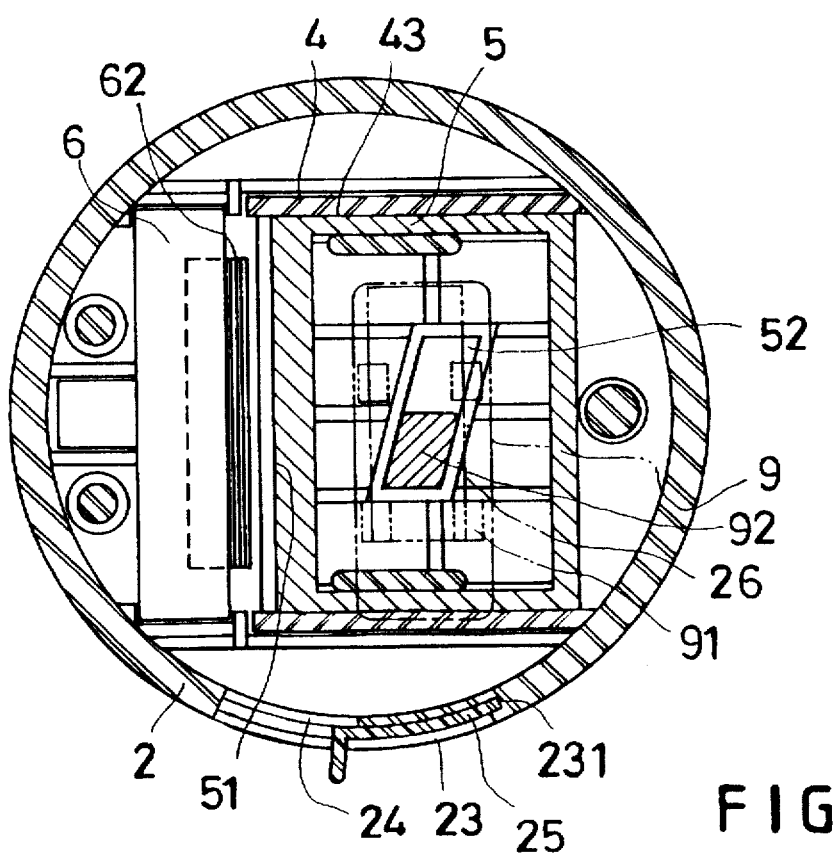
FIG. 3 is a buttom view of a pepper grinder with an improved fixing element according to the present invention.
Figure 6:
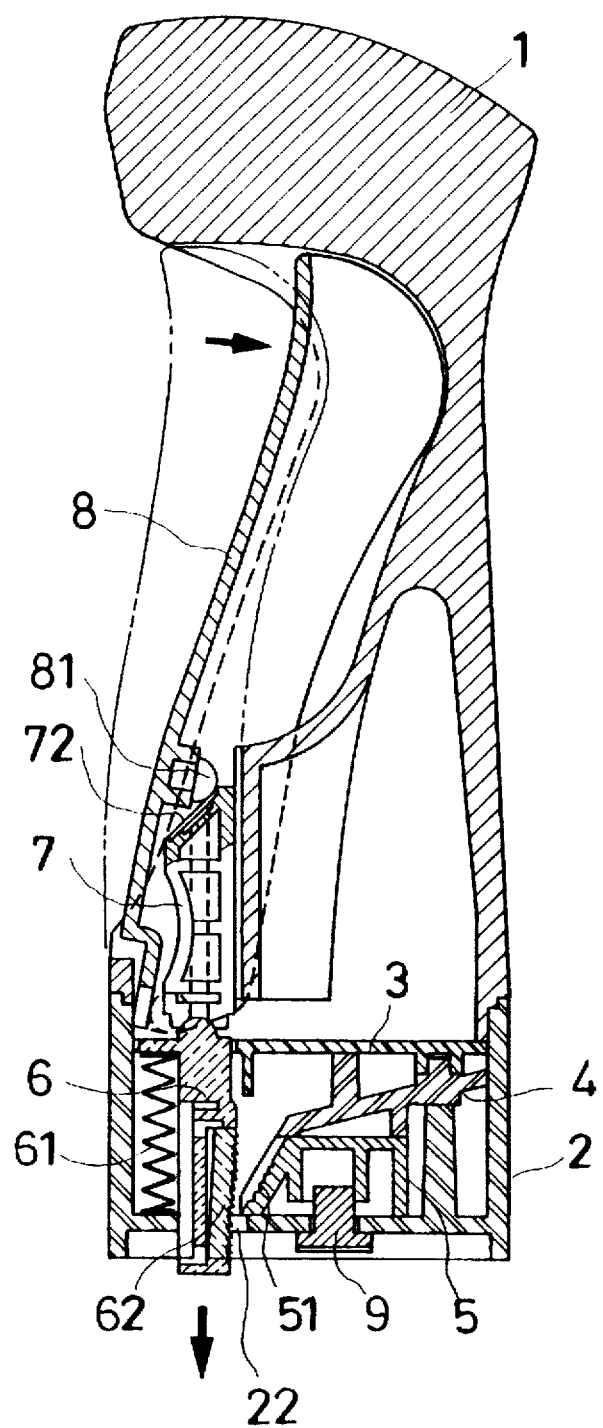
FIG. 6 is a view showing to adjust the toothed portion and the toothed plate and push the handled member for grinding the pepper down; and, FIG. 7 is a view show the pepper grinder which is grinding the pepper down.
Figure 7:
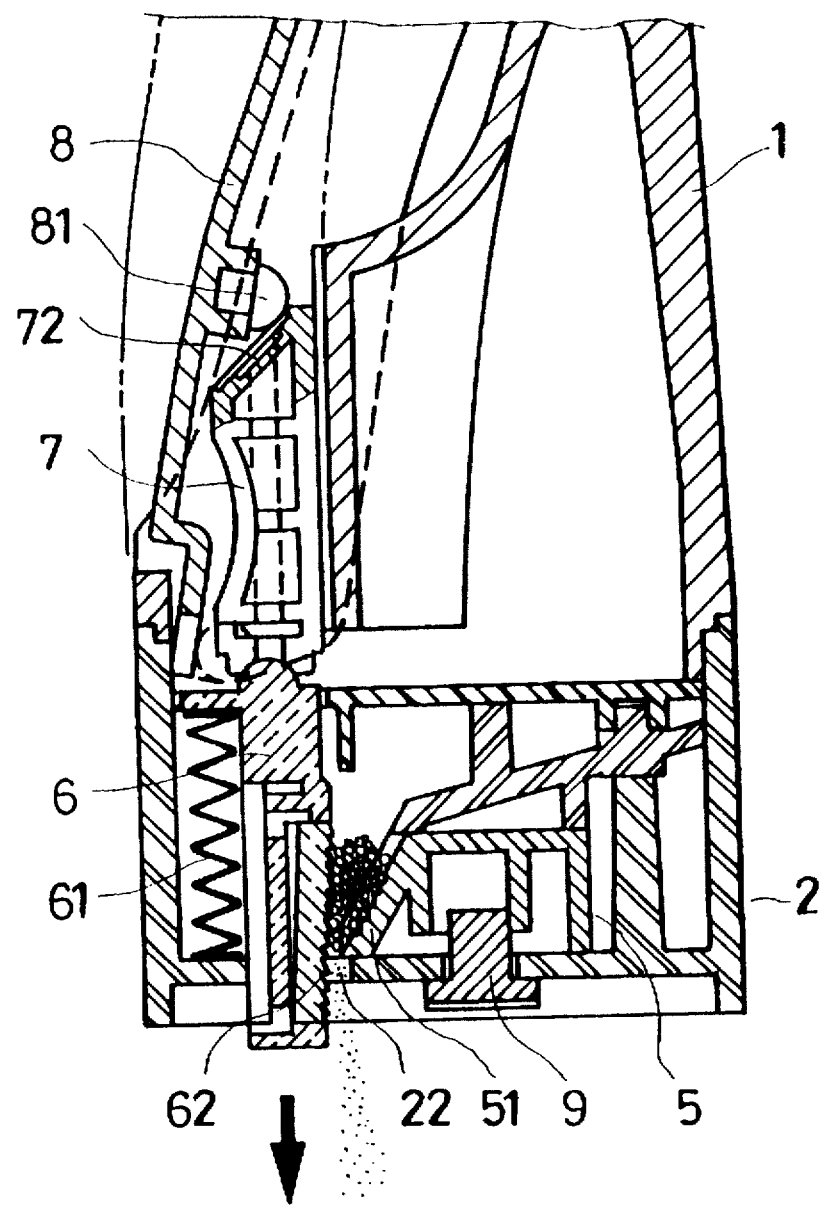

A toothed plate 62 is anchored onto a bottom of an inward side of the movable member 6 and opposes the sloped toothed portion 51. The bottom socket 2 is then coupled with the head member 1 firmly with an upper circumference thereof retaining, and gripping, the flange 11 of the bead member The depressed block 7 is arranged in the hollow portion 12, connected to the movable member 6 on a bottom portion, and movably held between two blocking blocks 121 extending from the head member 1. Furthermore, referring to FIG. 4, the depressed block 7 is formed to have two elongated gaps 71 on two sides thereof. There are provided two extension parts 122 extending from within the hollow portion 12 and over said two sides of the depressed block 7 with two elongated protrusions 123 thereof fitted into the elongated gaps 71 respectively. The depressed block 7 is movable along the elongated protrusions 123.

The handled member 8 is pivoted onto the head member 1 on a lowermost part thereof and is movably housed inside the hollow portion 12. The handled member 8 further has a pushing block 81 on a side opposing the depressed block 7. The pushing block 81 is shaped curve, and arranged over a slope 72 on an uppermost part of the depressed block 7 such that the handled member 8 can depress the depressed block 7 downward upon downward pivotal movement inwardly of the hollow portion 12.

When the handled member 8 is pressed inwardly of the hollow portion 12, the movable member 6 slides downward together with the depressed block 7 depressed by the pushing block 81 on the slope 72. Meanwhile, the spring 61 is compressed and stores a resilient force such that the movable member 6 and the depressed block 7 can be propped upward up to the original position when the user releases his pressure on the handled member 8.

Pepper insde the bottom socket 2 is ground to finer ones by the toothed plate 62 and the toothed portion 51 in the sliding movement of the toothed plate 62. The operator can continously press and release the handled member 8 to make the toothed plate 62 slide reciprocatingly.

Figure 2:
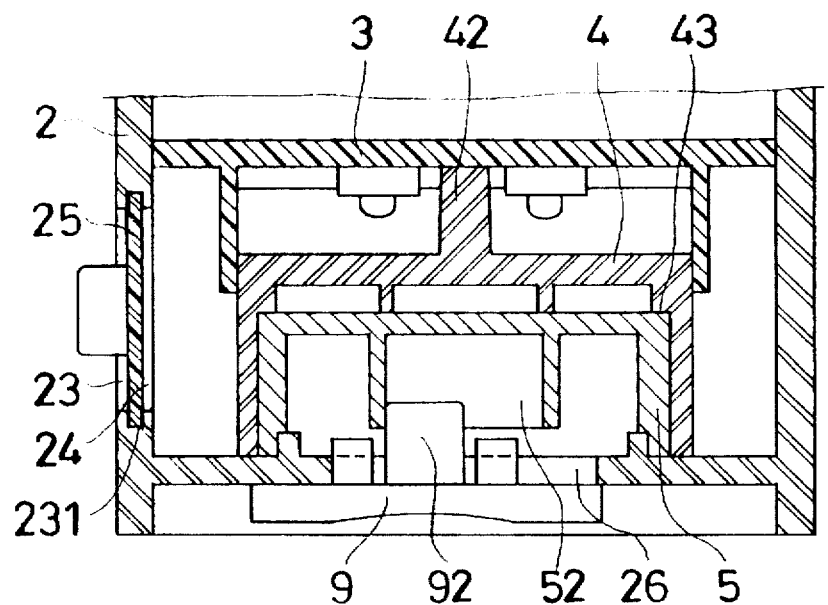
FIG. 2 is a sectional view of buttom part of a pepper grinder with an improved fixing element according to the present invention.

Referring to FIG. 2, there is provided a holding trench 23 on the circumference of the bottom socket 2, and a condiment entrance 24 is opened, substantially corresponding to the holding trench 23.

The entrance 24 is smaller than the trench 23. The trench 23 has grooves 231 in both upper and lower sides for a slidable door 25 to be fitted into and capable of sliding along said grooves 231 so that the entrance 24 can be closed or opened by moving the door 25.

There is provided a opening 26 shaped substantially rectangular on the bottom socket 2. An adjustment block 9 is fitted onto the opening 26 with a plurality of L-shaped engagement portions 91 thereof passed through the opening 26 to connect with the bottom socket 2. The block 9 further has a pushing portion 92 shaped substantially as a parallelogram on a mediate portion thereof.

The pushing portion 92 is passed through the opening 26 and fitted into a channel 52 formed under the adjustable grinder part 5 so that the pushing portion 92 can force the grinder part 5 to slide forward and backward as long as the adjustment block 9 is moved leftward and rightward along the opening 26. When the grinder part 5 slides forward, the toothed portion 51 is moved closer to the toothed plate 62, and so pepper can be ground to even finer ones in the reciprocating sliding movment of the toothed plate 62.

In operation, pepper is inserted through the entrance 24 into the bottom socket 2 and then the door 25 is slided to close the entrance 24. The operator presses the handled member 8 in a reciprocating manner so that the depressed block 7 plus the movable member 6 and the toothed plate 62 are forced to slide, using the spring 61 as the upward resilient force for the same.

Thus, the toothed plate 62 and the toothed portion 51 of the grinder part 5, the position of which is initially adapted for desired degree of fineness of pepper, can grind the pepper therebetween into finer one. The ground pepper is then dropped out of the bottom socket 2 through the condiment exit 22.

In adjusting the adjustable grinder part 5, the adjustment block 9 is pushed leftward or rightward so that the pushing portion 92 within the channel 52 can force the grinder part 5 to move forward or backward to adjust the distance between the toothed plate 62 and the toothed portion 51.

From the above description, this invention can be known to have advantages as follows:

1. Only reciprocating pressing action of the operator is needed for grinding pepper so the tool of this invention is easy to operate; and, 2. the degree of fineness of the pepper can be adapted for need by means of the adjustment block 9.

While the preferred embodiments of the invention have been described above, it will be recognized and understood that various modifications may be made therein and the appended claims are intended to cover all such modifications which may fall within the spirit and scope of the invention.

What is claimed is:

1. A condiment grinding tool for grinding a condiment into ground particulates comprising:

(a) a head member having a hollow portion and a lower end portion;

(b) a grinding support assembly coupled to said lower end portion of said head member, said grinding support assembly including:

(1) a bottom socket defining a bottom chamber for storing said condiment, said bottom socket having formed therein an exit opening disposed in open communication with said bottom chamber;

(2) a restraining plate coupled to said bottom socket, said restraining plate having a through hole formed therein;

(3) a guide member captured between said bottom socket and said restraining plate, said guide member having formed therein a channeled guide portion; and, (4) a grinder part disposed within said bottom socket, said grinder part adjustably engaging said channeled guide portion of said guide member, said grinder part having a toothed portion formed thereon;

(c) a grinding assembly coupled to said grinding support assembly, said grinding assembly extending through said restraining plate through hole to said exit opening of said bottom socket, said grinding assembly including:

(1) a linearly displaceable movable member, said movable member being coupled to said bottom socket in resiliently biased manner; and, (2) a toothed plate coupled to said movable member, said toothed plate being disposed in said bottom chamber substantially opposing said toothed portion of said grinder part;

(d) a handled member displaceably coupled to said head member, said handled member having a pushing block portion formed thereon; and, (e) a displaceable depressed block coupled to said grinding assembly for transfering a displacement of said handled member to a linear displacement of said movable member, said depressed block having a sloped surface adapted for engagement by said pushing block portion of said handled member;

whereby said condiment stored in said bottom chamber is ground between said toothed plate and said toothed portion of said grinder part into said ground particulates for dispensing thereof through said bottom socket exit opening.

2. The condiment grinding tool as recited in claim 1 wherein said bottom socket includes an entrance opening and slidable door means for reversible closure thereof, said entrance opening being in open communication with said bottom chamber.

3. The condiment grinding tool as recited in claim 1 wherein said head member includes a pair of laterally opposed blocking portions projecting therefrom, each said blocking portion having an elongate protrusion formed thereon.

4. The condiment grinding tool as recited in claim 3 wherein said depressed block is slidably captured between said head member blocking portions, said depressed block having laterally opposed sidewall portions, each of said sidewall portions having formed therein an elongate gap engaged by at least one of said elongate protrusions.

5. A condiment grinding tool for grinding a condiment into ground particulates comprising:
   (a) a head member having a hollow portion and a lower end portion, said lower end portion having formed therein a flange section;
   (b) a grinding support assembly engaging said lower end portion of said head member, said grinding support assembly including:
      (1) a bottom socket defining a bottom chamber for storing said condiment, said bottom socket having an inner surface and a plurality of erecting poles projecting therefrom, said bottom socket having formed therein an exit opening disposed in open communication with said bottom chamber;
      (2) a restraining plate coupled to said bottom socket and engaging said flange section of said head member lower end portion, said restraining plate having a through hole formed therein;
      (3) a guide member captured by said erecting poles of said bottom socket substantially against said restraining plate, said guide member having formed therein a channeled guide portion, said guide member having a plurality of projecting portions for supportingly engaging said restraining plate; and,
      (4) a grinder part disposed within said bottom socket, said grinder part adjustably engaging said channeled guide portion of said guide member, said grinder part having a toothed portion formed thereon;
   (c) a grinding assembly coupled to said grinding support assembly, said grinding assembly extending through said restraining plate through hole to said exit opening of said bottom socket, said grinding assembly including:
      (1) a linearly displaceable movable member, said movable member being coupled to said bottom socket in resiliently biased manner; and,
      (2) a toothed plate coupled to said movable member, said toothed plate being disposed in said bottom chamber substantially opposing said toothed portion of said grinder part;
   (d) a handled member displaceably coupled to said head member, said handled member having a pushing block portion formed thereon; and,
   (e) a displaceable depressed block coupled to said grinding assembly for transfering a displacement of said handled member to a linear displacement of said movable member, said depressed block having a sloped surface adapted for engagement by said pushing block of said handled member;
   whereby said condiment stored in said bottom chamber is ground between said toothed plate and said toothed portion of said grinder part into said ground particulates for dispensing thereof through said bottom socket exit opening.

6. A condiment grinding tool for grinding a condiment into ground particulates comprising:
   (a) a head member having a hollow portion and a lower end portion;
   (b) a grinding support assembly coupled to said lower end portion of said head member, said grinding support assembly including:
      (1) a bottom socket defining a bottom chamber for storing said condiment, said bottom socket having formed therein an exit opening and an adjustment opening, said exit opening being in open communication with said bottom chamber;
      (2) a restraining plate coupled to said bottom socket, said restraining plate having a through hole formed therein;
      (3) a guide member captured between said bottom socket and said restraining plate, said guide member having formed therein a channeled guide portion;
      (4) a grinder part disposed within said bottom socket, said grinder part adjustably engaging said channeled guide portion of said guide member, said grinder part having a toothed portion formed thereon; and,
      (5) an adjustment block slidably coupled to said bottom socket, said adjustment block having a pushing portion and a plurality of clip portions, said clip portions engaging said bottom socket through said adjustment opening thereof, said pushing portion being coupled to said grinder part for adjustable displacement thereof relative to said bottom socket;
   (c) a grinding assembly coupled to said grinding support assembly, said grinding assembly extending through said restraining plate through hole to said exit opening of said bottom socket, said grinding assembly including:
      (1) a linearly displaceable movable member, said movable member being coupled to said bottom socket in resiliently biased manner; and,
      (2) a toothed plate coupled to said movable member, said toothed plate being disposed in said bottom chamber substantially opposing said toothed portion of said grinder part;
   (d) a handled member displaceably coupled to said head member, said handled member having a pushing block portion formed thereon; and,
   (e) a displaceable depressed block coupled to said grinding assembly for transfering a displacement of said handled member to a linear displacement of said movable member, said depressed block having a sloped surface adapted for engagement by said pushing block portion of said handled member;
   whereby said condiment stored in said bottom chamber is ground between said toothed plate and said toothed portion of said grinder part into said ground particulates for dispensing thereof through said bottom socket exit opening.

* * * * *